INVENTOR
STUART W. SEELEY
BY
ATTORNEY

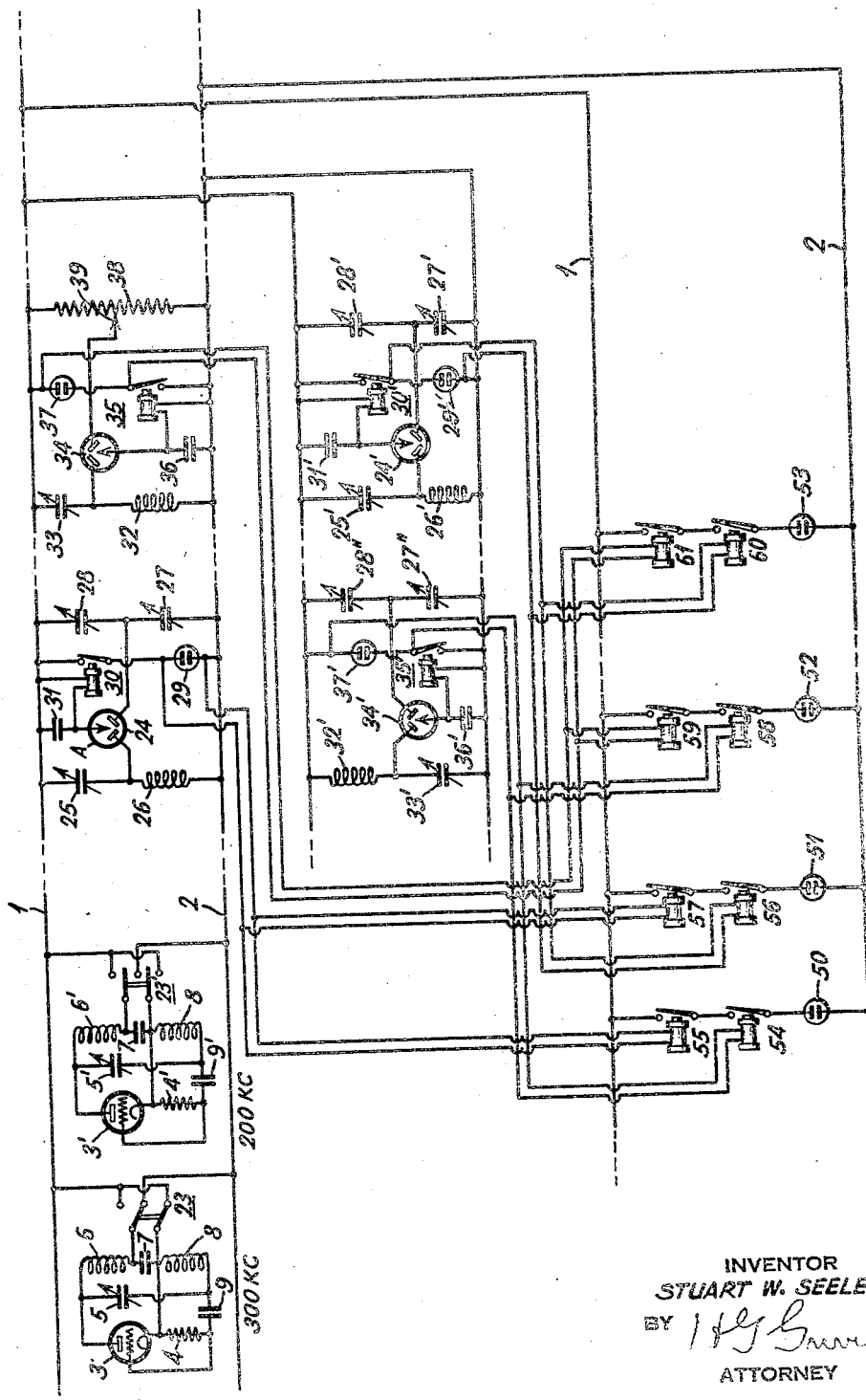

Patented Oct. 31, 1939

2,177,843

UNITED STATES PATENT OFFICE 2,177,843

REMOTE CONTROL SYSTEM OVER POWER LINES

Stuart W. Seeley, Bayside, N. Y., assignor to Radio Corporation of America, a corporation of Delaware Application July 3, 1937, Serial No. 151,821
Renewed March 30, 1939

19 Claims. (Cl. 171—97)

The present invention relates to remote control circuits generally and more specifically to methods and means for completely controlling electrical devices located at a central point from any one of several remote points.

Briefly, the invention provides means at the remote point for selectively generating oscillations having various predetermined distinguishable characteristics, means for transmitting the generated energy to the central point and means for utilizing the energy received at the central point to selectively operate the electrical devices. The means for transmitting the control energy from the remote point to the central point is preferably the commercial power supply network usually found in all buildings.

It is a prime object of the present invention to provide a system such as described above which consumes little or no stand-by power.

Other objects of the invention will unfold themselves in the following detailed specification when read in conjunction with the appended drawings.

In the drawings,

Figure 3 illustrates an extension of the invention shown in Figure 2 for controlling a large number of circuits from a remote point.

Figure 1:
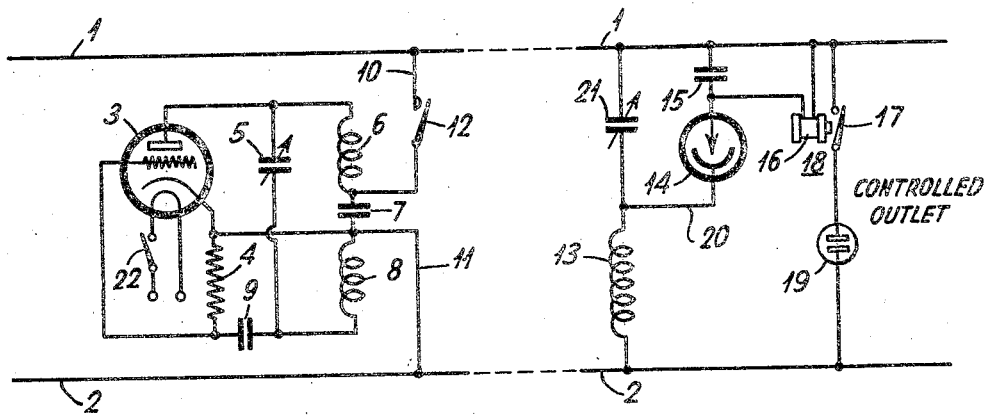
Figure 1 illustrates in schematic manner a remote control system using an oscillation generator at the remote controlling point and a device which uses no stand-by power at the controlled point.

Referring to Figure 1, the usual house wiring network is represented by two conductors 1 and 2 the dotted portions of which indicate the network throughout the house. Connected across the network, that is, between the conductors 1 and 2 at some point in the system at which it is desired to remote control, there is provided an oscillator circuit which preferably comprises a regeneratively coupled electron discharge device capable of generating oscillations. The electron discharge tube 3 is provided with an anode, a cathode and a grid. External circuits for the tube connect the anode and cathode to form an anode circuit and the grid and cathode to form a grid circuit. The anode and grid circuits are coupled through a tank circuit comprising a variable condenser 5, a pair of inductors 6 and 8 and a coupling capacity 7. Bias for the grid of the tube may be provided by the grid current flowing through the grid leak resistor 4 which is connected between the grid and cathode, it being noted that the grid is connected to the tank circuit through a grid condenser such as capacity 9.

The anode or space current for the tube is supplied by the alternating current network by connecting the anode of tube 3 to one side of the line for instance to conductor 1 through the inductor 6, a switch 12 and conductor 10 and connecting the cathode of tube 3 to the other side of the line, that is, to conductor 2. The last named connection is made through the medium of conductor 11 which also acts to connect one side of condenser 7 to line 2. The other side of condenser 7 is connected to line 1 by conductor 10 through switch 12. Since condenser 7 is adapted to be connected across conductors 1 and 2 it provides a coupling for transferring the oscillations generated by the tube 3 and its associated circuits to the alternating current network.

Since the network supplies alternating current the anode of the tube 3 is alternately positive and negative with respect to the cathode, thus, the tube can only generate oscillations during the positive half of each cycle, that is, for the connection shown by way of example, when the line 1 is positive with respect to line 2. It follows therefore the closure of switch 12 causes the oscillator circuit to send out a series of oscillations through the line 1, 2 intermittently, that is, during each positive half cycle. It is, of course, to be understood that the cathode of tube 3 is suitably energized in any desired manner as by connection of its heater to the network 1, 2 directly or through a transformer if a different voltage than that available is indicated by the type of tube used. The connection is made through a switch 22.

At the controlled point there is provided, in accordance with the invention, a tube 14 which may be a type 874 tube or a tube of substantially that type. This tube is provided with a pair of electrodes (anode and cathode) enclosed within an envelope filled with gas. Such a tube is known in the art as a gas tube and its characteristics are such that the tube does not start or break down until a certain voltage is developed between its two electrodes. In the particular arrangement shown the alternating current network potential by itself is not sufficient to break down or ionize the gas tube 14. However, if a proper voltage is superimposed from oscillator 3, the two peak voltages added together exceed the tube breakdown potential and a discharge through the tube takes place. This current discharge is used to operate a relay 18. The circuits associated with the gas tube 14 include a variable condenser 21 and an inductance coil 13 connected in series between the conductors 1 and 2.

The elements 21 and 13 form a tuned circuit which is in series with the line impedance and together therewith tune to the frequency of the energy generated by the oscillator 3. One electrode of the tube 14 is connected to a point common to the condenser 21 and inductance coil 13 whereas the other tube electrode is connected to conductor 1 through the winding 16 of relay 18. A condenser 15 shunts the relay winding. The relay 18 operates a switch 17 which when closed connects the controlled outlet 19 across the line.

Assuming that the network supply potential of 120 volts rms. (160 volts peak) 60 cycles is insufficient to break down or ionize the gas tube 14 and that the oscillator generates 300 kc. oscillations, then it will be seen that if the superimposed 300 kc. voltage increased by resonance in the tuned circuit plus the 60 cycle voltage exceed the breakdown potential, a discharge through the tube 14 and relay 18 is initiated. This continues until the supply voltage cycle carries the line voltage to the extinction potential, automatically stopping the discharge. If the oscillator is not operating the additional breakdown potential needed is not supplied. Thus it will be seen that no discharge takes place during the negative half cycle. During the next positive half cycle conditions are again such that discharge can take place if the additional oscillator potentials are present as when switch 12 is closed. This causes another pulse of current through the tube and relay. As long as the switch 12 is closed and the oscillator is intermittently operative, there flows through the relay 18 a pulse every 1/60 second and the switch 17 will be closed thereby, which as previously stated acts to connect the controlled outlet 19 across the line. It is apparent that the power to operate the relay is supplied by the alternating current line. In the arrangement shown the fact that a discharge once initiated constitutes a low impedance shunt across the tuned circuit is of no importance since the discharge once started is not extinguished excepting by a drop in line potential. Only the initiation of the discharge is required of the carrier potentials, that is, the 300 kc. energy.

The condenser 15 across the relay winding provides a by-pass for alternating current components from the line and prevents chattering of the relay while the key 12 is depressed. It is obvious that with such a system an electrical device such as a radio receiver could be turned "on" or "off" as desired by simply having the receiver plugged in at controlled outlet 19 and starting or stopping the remote half wave self-rectifying 300 kc. oscillator 3. It is also apparent that with the oscillator off, that is, with the switch 12 open, the relay 18 is not actuated and the entire system is quiescent and consumes no power.

A limitation exists in the above assumed conditions, that the line potential alone is insufficient to ionize tube 14 but that the line plus superimposed oscillator potentials are sufficient. This assumption requires that the tube breakdown potential must exceed peak line potential and that the tube extinction potential be considerably lower than peak line potential. While the line potentials could be readily adapted to the critical tube potentials by means of transformers or potential dividers, these devices would add considerably to the cost of the system and are otherwise undesirable. Furthermore, these devices consume considerable power in the stand-by condition due to the fact that any divider used must be sufficiently large to pass relay operating currents during operating intervals. Line voltages range from 90 to 135 volts rms. and these voltages correspond to peak voltages of 126 to 190 respectively. If a gas tube were designed for breakdown at 190 volts (135 rms.) it would require 64 peak volts from the oscillator to ionize if operated on a 126 volt (90 volt rms.) line. If designed to ionize at a peak value corresponding to 126 rms. volts it would spontaneously ionize on higher line voltages regardless of the presence of the 300 kc. potentials. While it is true that the line voltages mentioned above are extremes, it is a fact that they do represent possible variations.

Figure 2:
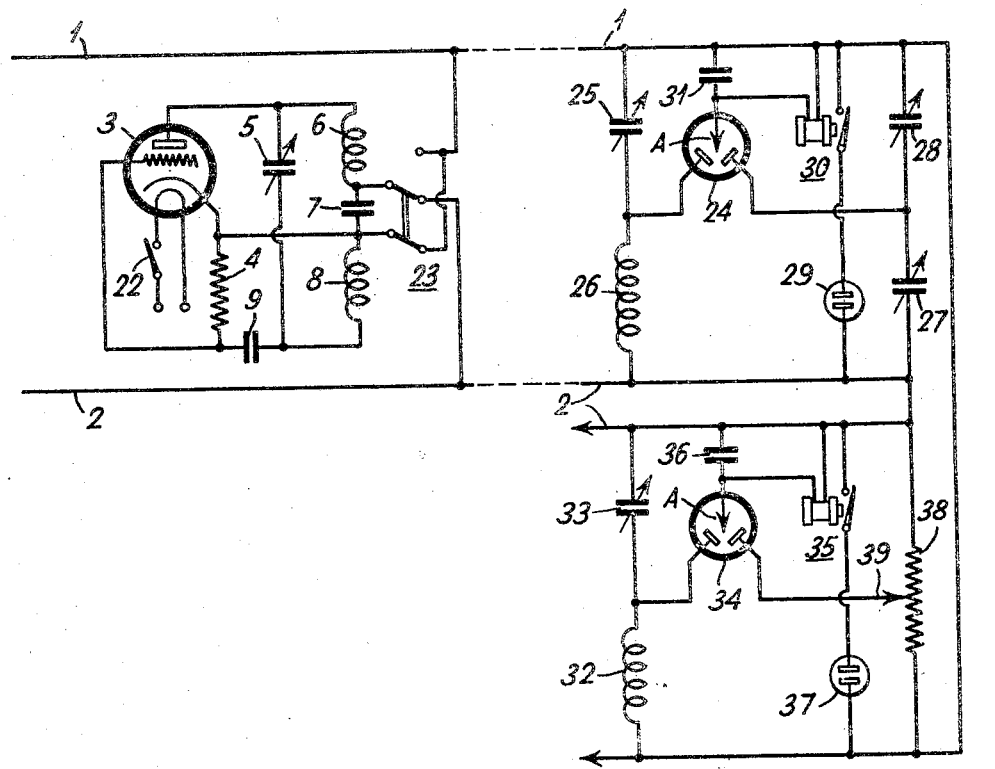
Figure 2 illustrates schematically an arrangement constructed in accordance with the invention and which is capable of remotely controlling several electrical devices by means of a single oscillator oscillating at one frequency.

In order to minimize these limitations, in accordance with the present invention, there is utilized a 3 element gas discharge tube in place of the tube 14. A 3 element gas discharge tube has decided advantages as a control or relay element over a 2 element tube as will appear below. The three element tubes consist essentially of two similar electrodes closely spaced and an anode spaced at a relatively large distance from the other two electrodes, all three elements being within a low pressure gas filled envelope. The space between the two close, similar, or "control" electrodes constitutes a control gap which will break down with a potential difference between control electrodes of about 70 peak volts. The space between either or both control electrodes and the anode will break down at about 190 peak volts in the absence of ionization between control electrodes. However, if the control path is ionized the anode to control element path also breaks down, however, no current will flow from either control element to the anode unless the anode is positive with respect to the control electrodes. If the control path is ionized, ionization and low resistance paths exist between all the electrodes until the highest voltage between any two elements falls below the extinction potential, which is about 60 volts. A circuit arrangement for using this type of tube is shown in Figure 2. In this figure the oscillator circuit including tube 3 is the same as the oscillator circuit shown in Figure 1 excepting that a pole changer switch 23 is provided for reversing the connections of the oscillator circuit with respect to the conductors 1 and 2. In other words, in the position of switch 23 shown, the anode of tube 3 is connected to the conductor 2 whereas the cathode is connected to the conductor 1. With the switch 23 thrown to its other extreme position, the anode of the tube will be connected to the conductor 1 and the cathode to the conductor 2. The purpose of the pole changer switch is to change the phase of the anode supply voltage so as to determine during which alternate half cycles of the power supply current, oscillations are generated. With switch 23 in the position shown, the tube 3 oscillates during those alternate half cycles of the A. C. supply when the conductor 2 is positive with respect to conductor 1, whereas, with switch 23 in its other extreme position, oscillations are generated only during those half cycles when conductor 1 is positive with respect to conductor 2.

From what precedes, it is evident that the oscillations generated by the oscillator tube are modulated in intensity by the 60 cycle alternating current. This modulation is due to the rise and fall as well as the reversal of the 60 cycle potentials applied to the anode of the oscillator tube. The modulation components so produced contain a predominant 60 cycle characteristic. It, therefore, may be considered that changing the position of the polarizing switch from one extreme position to the other, in effect, produces a 180° phase change in the 60 cycle modulation component of the oscillator.

To take advantage of the phase change, there are provided two controlled circuits at the controlled point of the network both of which are shown as incorporating three element gas tubes. The first of these circuits comprises a three element gas tube 24 of the type described above. The anode A of tube 24 is connected to conductor 1 through the winding of relay 30, said winding being shunted by a condenser 31. The winding of relay 30 works on a switch device which connects or disconnects the controlled outlet 29 to the network conductors 1 and 2. As in the case of Figure 1 a circuit is connected between the two conductors 1 and 2 comprising a variable condenser 25 and an inductance coil 26 in series. In this case also the series circuit tunes in series with the line impedance to the oscillator frequency. One of the two like electrodes of tube 24 is connected to a point of the series circuit which is common to the condenser 25 and the inductance coil 26. The other like electrode is connected to a point intermediate two series connected condensers 27 and 28 connected across the line and acting as a capacity divider. The action of the divider is to impress between the two like electrodes of the tube 24 a "polarizing" or initial 60 cycle voltage just insufficient to cause ionization of the control space. The operation of the device shown in Figure 2 and thus far described may be explained as follows:

In the absence of any carrier voltages from the remote oscillator 3, the normal line potential between the anode A of tube 24 and either control electrode, is insufficient to ionize the electrode interspace. If the superimposed potential supplied by the oscillator 3 and the line 1, 2 reach the 190 volt breakdown value, current will flow through the tube 24 and thus through the winding of relay 30 during a portion of the remaining half cycle of the power supply. This action is similar to that of the two element tube shown in Figure 1. If the oscillator and line voltages are insufficient to ionize the tube 24 an instantaneous peak voltage of 60 between the two like or control electrodes will do so. As previously stated, the divider 27, 28 impresses between the control electrodes a "polarizing" or initial 60 cycle voltage which is just insufficient to cause ionization of the control space. Under these conditions the remote oscillator potential stepped up by the tuned circuit, including condenser 25 and inductance coil 26, has only to supply the difference between the divider peak voltage and the control gap ionizing potential, which may be adjusted by setting the divider.

In practice, it is desirable that the divider voltage be kept substantially below the breakdown value to avoid operation due to possible line voltage fluctuations. It is obvious that other types of dividers can be employed and as a matter of fact a resistance divider for the same purpose will be described hereinafter in connection with another portion of the circuit arrangement. If a resistance divider is used it should be of the order of one megohm in order that it may not consume any appreciable power. A capacity divider appears to be the better practice since by the use of condensers having capacities of the order of 100 μμf. the stand-by currents are negligible and the power is zero since the currents are in quadrature.

At this point it should be observed that tube 24 will pass current only if the alternate half cycles during which the anode of oscillator tube 3 is positive causing the tube to generate oscillations, are in phase with the alternate half cycles during which the anode A of tube 24 is positive. It follows, therefore, that with switch 23 in the position shown current will not pass through the tube 24 nor the relay 30 despite the fact that the oscillator 3 is operative. However, by throwing switch 23 to its other extreme position and thereby changing the polarity of the oscillator supply voltage so that oscillations are produced during the other alternate half cycles of the power supply, the time interval of the oscillations from tube 3 corresponds to the half cycle during which the anode of the gas tube 24 is positive thus causing the gap between the anode A of tube 24 and the like electrodes to pass current through the tube and hence through the winding of relay 30.

This characteristic of the circuits here described may be utilized to control two relay circuits by a single oscillator making it possible to perform four functions on a single control frequency. For this purpose, there is provided a second three element gas tube 34 which is substantially the same as tube 24 except that it is connected across the line 1, 2 in opposite phase, that is, the anode A of tube 34 is connected to conductor 2. In the case of this second circuit a resistor divider has been made use of in place of the capacity divider. For this purpose, a resistor 38 is connected across the line 1, 2 and one of the like or control electrodes is connected to a point of resistor 38 by means of a preferably variable tap 39. The other like electrode is connected to a point of a tuned circuit between a variable condenser 33 and inductance coil 32. These two elements together with the line impedance tune to the oscillator frequency. A relay 35 is provided and its winding is in the connection between the anode of tube 34 and conductor 2. The relay 35 operates an associated switch which when closed connects the controlled outlet 37 across the line. The winding of relay 35 is shunted by a condenser 36 to prevent chattering, it being understood that the condenser smooths the pull of the relay.

The operation of the tube 34 and its circuits is the same as tube 24 excepting that it works on the opposite phase. In other words current will pass through tube 34 and hence through the winding of relay 35 when switch 23 is in the position shown but not when in its other extreme position. This is due to the fact that while the space between the like electrodes will be ionized during the time of each of the oscillator pulses, the anode A is negative with respect to either one of the like electrodes during that time and the unidirectional conductivity characteristics of the path between anode A and either of the like electrodes are such that current sufficient to close the relay will flow through that path only when anode A is positive.

It should be quite obvious now that to operate relay 30 the switch 23 is thrown to its extreme upward position which causes current to pass through tube 24 and thus through relay 30. To operate relay 35 the switch is thrown to the position shown. In the midway position of switch 23 neither relay is operated since no oscillation will be generated by oscillator 3.

The arrangement shown in Figure 2 may be extended to any degree desired, for instance, by installing a second oscillator circuit which produces energy of a different frequency, two other outlets may be controlled directly and by combination of the two frequencies and the phases, four additional outlets may be controlled, making eight controlled outlets with but two oscillators each oscillator operating at a single frequency. Such an arrangement is shown in Figure 3 wherein the oscillators 3 and 3' are alike in all respects except that one of them, let us say oscillator 3, generates 300 kc., and oscillator 3' generates 200 kc. Switches 23 and 23' are for changing the phase of the oscillator anode supply voltage as previously described. It will be evident from the preceding explanation that oscillator 3 will operate relay 30 associated with gas tube 24 when switch 23 is in its upward extreme position and that it will operate relay 35 associated with gas tube 34 when switch 23 is in the position shown. It is, of course, assumed that condenser 25 and inductance coil 26 together with the line impedance tune to 300 kc. and that condenser 33 and inductance coil 32, together with the line impedance also tune to 300 kc. The additional two gas tubes 34' and 24' are associated with tuning circuits 32' and 33' and 25' and 26' respectively. These circuits, together with the line impedance tune to the 200 kc. which is generated by the oscillator 3'. It follows that with the switch 23' of oscillator 3' in its extreme upward position, the relay 30' associated with tube 24' will be operated, whereas, with the switch 23 in its lower extreme position the relay 35' associated with gas tube 34' will operate. The fact that there are two oscillators makes it possible to control the four other controlled outlets 50, 51, 52 and 53 as follows:

Relays 55 and 57 are connected across control outlet 29 so that when relay 30 operates to close its associated switch both relays 55 and 57, in addition to control outlet 29 are connected across the line 1, 2. The same is true with respect to control outlet 37 and relays 59 and 61. That is to say, upon operation of the relay 35 and closure of its associated switch the relays 59 and 61 are energized, thus closing the associated switches. Relays 54 and 58 are associated with the controlled outlet 37', and are thus energized upon closure of the switch associated with the relay 35'. The relays 56 and 60 are associated with the controlled outlet 29' and become energized upon closure of the switch associated with relay 30'. If it is desired to operate the controlled outlet 50 to perform any desired function thereby, it will be seen that it is necessary to energize the switches associated with both relays 54 and 55. Since relay 55 is connected to the circuit associated with gas tube 24 it will be seen that the only way in which relay 55 becomes energized is by operation of the oscillator 3 with the switch 23 in its extreme upward position. Relay 54 is associated with the gas tube 34'. Hence in order that relay 54 may be operated to close its associated switch, it is necessary that oscillator 3' be operated by operating the switch 23' to its lowermost position. The operation of the other controlled outlets is believed to be obvious from the wiring diagram shown in Figure 3.

Extensions of the invention may be provided by changing the frequency of the generated oscillations and thereby providing for controlling other tuned relay circuits. The frequency of the generated oscillations may be varied in steps by any suitable mechanism or by means of a variable condenser as, for instance, 5 and 5' in Figure 3. In this way any number of controlled outlets may be provided.

It is, of course, apparent that numerous applications of remote control in homes, offices, factories and elsewhere are feasible and desirable provided that installation of wiring is not necessary between the remote control point and the apparatus to be controlled. In accordance with the invention, any electrical device may be connected to a controlled outlet. For instance, by connection of a radio receiver to the controlled outlet it is possible to turn the receiver on and off from a remote point. The invention may also be of great use in connection with commercial carrier-telephone systems which are utilized for communicating between various rooms or offices by utilizing the power lines for transmitting carrier frequency energy over short distances within the house or office building. It can be seen that in such a system there need never be any power consumed while the apparatus is in the standby condition, since the invention provides an arrangement whereby the units of the system would be connected to a controlled outlet and their energization started from a remote point at any time when it is desired to communicate, it being understood, of course, that the gas tubes utilized by applicant and herein described consume no power in the standby condition. Other applications of the present invention are for remote control of numerous electrical devices, such as lamps, signal bells, etc. It can be seen that an extended system such as shown in Figure 3 of the drawings may be used in combination with radio receiving apparatus having push-button tuning control. In such an arrangement one of the relays may be used to turn the set on, another one to turn the set off and the others to perform the equivalent of depressing a button for tuning in the radio receiver.

It will, of course, be understood that changes in the form, proportion and details of construction may be resorted to without departing from the spirit of the invention and scope of the appended claims.

I claim:

1. In a remote control system operable over an electrical power supply line, a series resonant circuit effectively shunted across opposite conductors of the power supply line, a gas tube having an anode connected to one of the conductors of the power supply line, and an auxiliary electrode connected to a point of the series resonant circuit, and actuating means interposed in the anode connection responsive to control currents transmitted over the power supply line and appearing across the series resonant circuit.

2. In a remote control system responsive to carrier currents transmitted over an electrical power supply line, a series resonant circuit tuned to the frequency of the carrier currents and comprising an inductor and a condenser in series, effectively shunted across opposite conductors of the electrical power supply line, a gas tube having an anode connected to one of the conductors of the power supply line, and an auxiliary electrode connected to a point of the series resonant circuit intermediate the inductor and condenser thereof and actuating means interposed in the anode connection responsive to the carrier currents transmitted over the power supply line and appearing across the series resonant circuit.

3. In a remote control system operable over an electrical power supply line, a series resonant circuit effectively connected across opposite conductors of the electrical power supply line, a gas tube having an anode and a pair of cold control electrodes, said anode being connected to one of the conductors of the power supply line, means connecting one of the cold control electrodes to an intermediate point of the series resonant circuit, means including impedance for connecting the other cold electrode to both conductors of the power supply line and actuating means interposed in the anode connection responsive to control currents transmitted over the power supply line.

4. In a remote control system responsive to carrier currents transmitted over an electrical power supply line, a plurality of operable switching means each acting upon selective operation thereof to effect the control of an individual one of a plurality of electrical devices, means for controlling the operable switching means comprising a standby gas tube effectively connected across the supply line and arranged so that a potential derived from the supply line is normally maintained to cross the tube, said potential being slightly less than the potential necessary to ionize the gas tube, a relay for operating one of said switching means, said relay being connected with the gas tube and arranged so as to be energized sufficiently to operate its switching means only when the gas tube passes current.

5. In a remote control system responsive to control carrier currents transmitted over an electrical power supply line, a plurality of operable switching means each acting upon selective operation thereof to effect the control of an individual one of a plurality of electrical devices, means for controlling the operable switching means comprising a space discharge tube having an anode and two other electrodes, said anode being connected to one of the conductors of the power supply line, means including impedance for connecting one of said other electrodes to both conductors of the power supply line, a series resonant circuit tuned to the frequency of the control carrier currents effectively connected across the opposite conductors of the electrical power supply line, means for connecting the other of said other electrodes of the tube to an intermediate point of said series resonant circuit, and a relay for operating the switching means interposed in the anode connection, said relay being responsive to the space current of said tube.

6. In a remote control system responsive to carrier currents transmitted over an alternating current power supply line, a plurality of operable switching means each acting upon selective operation thereof to effect the control of an individual one of a plurality of electrical devices, means for controlling the operable switching means comprising a standby gas tube connected across the supply line and arranged so that a potential derived from the supply line is normally maintained across the tube, said potential being slightly less than the potential necessary to ionize the tube, a relay for operating one of the switching means, said relay being connected with the gas tube and being arranged so as to be energized sufficiently to operate its switching means only when the gas tube passes an appreciable amount of current, said gas tube comprising an anode and a pair of control electrodes and being characterized by that appreciable current will flow through the tube only when the anode of the tube is positive with respect to the control electrodes despite ionization of the tube.

7. In a relay circuit, a gas tube having an anode, a cold cathode-like electrode and a starter electrode, said tube being characterized by that a predetermined voltage may be maintained between the cathode-like electrode and the anode without causing current to pass through the tube and by that the tube breakdown occurs upon the application of a predetermined voltage between the starter electrode and the cold cathode-like electrode, an electrical power supply line, a circuit including an inductance and a condenser in series effectively connected between opposite conductors of the power supply line, said inductance and condenser constituting a tuned circuit in series with the line, a bleeder circuit connected between the opposite conductors of the power supply line, means for applying substantially the full power line voltage between the anode and cold cathode-like electrode of the tube comprising a connection, including an actuating device, between the anode and one of the power line conductors and a connection, including said inductance, between the cathode-like electrode and the other power line conductor, and means for supplying the starter electrode with a potential which is just below that required for breakdown of the tube, said last named means comprising a connection between the starter electrode and a point of the bleeder circuit.

8. In a relay circuit adapted to be controlled by means of high frequency carrier energy impressed upon a power supply line, a tube having an anode, a cold cathode-like electrode and a starter electrode, said tube being characterized by that a predetermined voltage may be maintained between the cold cathode-like electrode and the anode thereof without causing appreciable current to pass through the tube and further by that the tube breaks down upon the application of a predetermined voltage between the starter electrode and the cold cathode-like electrode, an electrical power supply line over which the high frequency carrier energy is transmitted, a series resonant circuit effectively connected between opposite conductors of the power supply line and constituting a circuit tuned to the frequency of the high frequency carrier energy in series with the line, a potential divider connected across the power supply line, means for applying a potential derived from the normal power line potential between the anode and cold cathode-like electrode of the tube comprising a connection, including an actuating device, between the anode and one of the power line conductors and a connection, including at least a portion of said series resonant circuit, between the cathode-like electrode and the other power line conductor, and means for supplying the starter electrode with a potential which is just below that required for breakdown of the tube comprising a connection between the starter electrode and a point of the voltage divider circuit.

9. In a remote control system operable over an electrical power supply line, a series resonant circuit comprising an inductance and a condenser connected between opposite conductors of the power supply line and constituting a tuned circuit in series with the line, a potential divider circuit effectively connected between the two conductors of the power supply line, a gas tube having an anode, a cold cathode-like electrode and a starter electrode, a connection between the anode of the tube and one of the power line conductors, a connection including at least one of the elements of said series resonant circuit between one of the other two electrodes of the tube and the other power line conductor, and a connection between the other of the last two named electrodes and a point of the voltage divider circuit, said anode connection including an actuating device responsive to changes in the space current of said tube.

10. In a remote control system of the type wherein controlling signal currents of predetermined frequency are transmitted from a remote point to a controlled point over an existing power supply line, a resonant circuit tuned to the frequency of the controlling signals and electrically connected to the power supply line for intercepting and resonanting the controlling signal currents, a gas tube having an anode connected to one of the conductors of the power supply line and an auxiliary electrode electrically connected to said resonant circuit whereby the currents present in the resonant circuit are impressed upon said auxiliary electrode and actuating means interposed in said anode connection.

11. In a remote control system of the type wherein controlling signal currents of predetermined frequency are transmitted from a remote point and received at a controlled point, a resonant circuit at the controlled point responsive to the transmitted controlling signal currents, a power supply line, means for connecting a point of the resonant circuit to one of the conductors of said power supply line, a gas tube having an anode connected to another of the conductors of said power supply line and an auxiliary electrode connected to another point of said resonant circuit, and actuating means interposed in said anode connection.

12. In a relay circuit, a glow discharge tube having an anode, an auxiliary cold electrode and a starter electrode, said tube being characterized by that a predetermined voltage may be maintained between the auxiliary electrode and the anode without causing current to pass through the tube and further by that the tube breakdown occurs upon the application of a voltage between the starter electrode and the auxiliary electrode in excess of a certain predetermined value, an electrical power supply line, a resonant circuit including inductance and capacity effectively connected to the power supply line to receive signal carrier energy impressed upon the power supply line, a bleeder circuit connected between opposite conductors of the power supply line, means for maintaining said first named predetermined voltage between the anode and auxiliary electrode of the tube, said last named means comprising a connection including an actuating device between the anode and one of the power line conductors and a connection including at least a portion of said resonant circuit between the auxiliary electrode and the other power line conductor, and means for supplying the starter electrode with a potential which is just below that required for breakdown of the tube comprising a connection between the starter electrode and a point of the bleeder circuit.

13. In a carrier actuated relay circuit, a glow discharge tube having an anode, an auxiliary electrode and a starter electrode, said tube being characterized by that a predetermined voltage may be maintained between the auxiliary electrode and the anode without causing current to pass through the tube and further by that a breakdown occurs in the tube upon the application of a voltage between the starter electrode and the auxiliary electrode in excess of a certain predetermined value, an electrical power supply line, a resonant circuit including inductance and capacity effectively connected to the power supply line so as to be excited by the presence of signal carrier energy upon the power supply line, a bleeder circuit connected between opposite conductors of the power supply line, means for applying said first named predetermined voltage between the anode and the auxiliary electrode of said tube, said last named means comprising a connection including an actuating device between the anode and one of the power supply line conductors and a connection including at least a portion of said resonant circuit between the auxiliary electrode and another power supply line conductor, means for supplying the starter electrode with a potential which is just below that required for breakdown of the tube comprising a connection between the starter electrode and a point of the bleeder circuit, and means for causing breakdown of the tube and consequent operation of said actuating device comprising means for generating and impressing upon the power supply line signal carrier energy of such frequency to excite said resonant circuit whereby the potential between the auxiliary electrode and the starter electrode is increased sufficiently to cause a breakdown in the tube.

14. In a carrier actuated relay circuit, a glow discharge tube having an anode, an auxiliary electrode and a starter electrode, said tube being characterized by that a predetermined voltage may be maintained between the auxiliary electrode and the anode without causing current to pass through the tube and further by that a breakdown occurs within the tube upon the application of a voltage between the starter electrode and the auxiliary electrode in excess of a certain predetermined value, an alternating current distribution system, a resonant circuit including inductance and capacity effectively coupled to said distribution system and arranged to be excited by high frequency carrier energy present upon the distribution system, a bleeder circuit connected between opposite conductors of the distribution system, means for applying a voltage derived from the distribution system between the anode and the auxiliary electrode of said tube, comprising a connection including an actuating device between the anode and one of the conductors of the distribution system and a connection including at least a portion of said resonant circuit between the auxiliary electrode and another conductor of the distribution system, means for supplying the starter electrode with a potential which is derived from the distribution system, said potential having a value which is just below that required for breakdown of the tube, said last named means comprising a connection between the starter electrode and a point of the bleeder circuit, means for generating and impressing upon the distribution system high frequency control currents of the frequency to which said resonant circuit is tuned during alternate half cycles of the alternating current wave of said distribution system and for interrupting said currents during opposite half cycles to thereby excite said resonant circuit, said tube breaking down during the time that the resonant circuit is excited only during the alternate half cycles of the alternating current wave in said system when the anode is positive with respect to the auxiliary electrode.

15. In a carrier actuated relay circuit, a three electrode glow discharge tube one of said electrodes comprising an anode, another thereof a cathode-like electrode and the third thereof a starter electrode, said tube being characterized by that a predetermined voltage may be maintained between the cathode and the anode without causing current to pass through the tube and further by that the tube passes current upon the application of a voltage between the starter electrode and the cathode in excess of a certain predetermined value, an alternating current distribution system, a resonant circuit including inductance and capacity, means for connecting a point of said resonant circuit to one of the conductors of said distribution system and another point thereof to said cathode, a bleeder circuit connected between said last named conductor of the distribution system and another conductor thereof, means including an actuating device for connecting the anode of said tube to said last named conductor of the distribution system whereby a voltage derived from the distribution system is maintained between the anode and the cathode, means for supplying the starter electrode with a potential derived from the distribution system the value of which is just below that required for breakdown of the tube, said last named means comprising a connection between the starter electrode and a point of the bleeder circuit, means for generating and transmitting high frequency control energy of the frequency to which said resonant circuit is tuned, means for receiving and impressing the transmitted high frequency energy upon said resonant circuit to cause the same to become excited and thereby increase the potential between the cathode and starter electrode to a point causing breakdown of the tube and consequent operation of the actuating device.

16. In a remote control arrangement, an alternating current distribution system including a pair of conductors, means including at least one thermionic tube oscillator deriving its energizing potentials from said alternating current distribution system for selectively generating and transmitting carrier control energy of a predetermined frequency during one set of alternate half cycles of the alternating current wave of said distribution system in one condition of operation and carrier control energy of a predetermined frequency during the opposite set of alternate half cycles of the alternating current wave of said distribution system in another condition of operation, a receiving system comprising a glow discharge tube having an anode, an auxiliary electrode and a starter electrode, said tube being characterized by that a predetermined voltage may be maintained between the auxiliary electrode and the anode thereof without causing current to pass through the tube and further by that current is caused to pass through the tube upon the application of a voltage between the starter electrode and the auxiliary electrode in excess of a certain predetermined value, a resonant circuit tunable to the frequency of said first named carrier control energy, means for connecting a point of the resonant circuit to one of the conductors of said distribution system, means for connecting another point of said resonant circuit to the auxiliary electrode of said glow discharge tube, a bleeder circuit connected between said last named conductor and the other conductor of the distribution system, means including an actuating device for connecting the anode of the glow discharge tube to the last named conductor of the distribution system whereby a potential is applied to said anode which is alternately positive and negative with respect to the auxiliary electrode, means for supplying the starter electrode with an alternating current potential derived from said distribution system the value of which with respect to the auxiliary electrode is just below that required for breakdown of the tube, said last named means comprising a connection between the starter electrode and a point of said bleeder circuit, means for receiving and impressing between the auxiliary electrode and the starter electrode of the glow discharge tube the carrier control energy transmitted by said first named means, said glow discharge tube being responsive only to the control carrier currents transmitted by said first named means during that set of alternate half cycles of the alternating current wave of the distribution system which makes the anode of the glow discharge tube positive with respect to the auxiliary electrode thereof.

17. In a remote control arrangement such as described in the next preceding claim, a second glow discharge tube connected to the alternating current distribution system in an opposite sense with respect to the first glow discharge tube, said second glow discharge tube being responsive to carrier control currents transmitted by the first named means during the other set of alternate half cycles of the alternating current wave of the distribution system.

18. In a remote control system, an alternating current network, a plurality of selectively operable relays connected to said network and located at a central point, one of said selectively operable relays being responsive to control carrier currents of a predetermined frequency impressed thereon during alternate half cycles of the alternating current wave of said network, another of said selectively operable relays being responsive to control carrier currents of the same frequency as the first named control carrier currents but impressed upon said second operable relay during opposite alternate half cycles of the alternating current wave of said network, a third one of said selectively operable relays being responsive to control carrier currents of a different frequency than said first named frequency impressed upon said third operable relay during said first named alternate half cycles of the alternating current wave of said network, a fourth one of said selectively operable relays being responsive to control carrier currents of the same frequency as the last named frequency but impressed upon said forth selective operable relay during said opposite alternate half cycles of said alternating current wave, selectively operable means at a control point remote from said central point for effecting the following operations at the will of the operator: (1) controlling said first named selectively operable relay by generating and transmitting thereto carrier control currents of said first named predetermined frequency during said first named alternate half cycles of the alternating current wave, (2) controlling said second named selectively operable relay by generating and transmitting thereto carrier control currents of said first named frequency during said opposite alternate half cycles of the alternating current wave, (3) controlling said third named selectively operable relay by generating and transmitting thereto carrier control currents of said different frequency during said first named alternate half cycles of the alternating current wave, (4) controlling said fourth named selectively operable relay by generating and transmitting thereto carrier control currents of said different frequency during said opposite alternate half cycles of the alternating current wave.

19. In a remote control system, an alternating current power supply network, a plurality of selectively operable relays connected to said network and energized by alternating current derived from said network, said relays being located at a central point, one of said selectively operable relays being responsive to control carrier currents impressed thereon during alternate half cycles of the alternating current wave of said network, another of said selective operable relays being responsive to control carrier currents impressed upon the second operable relay during opposite alternate half cycles of the alternating current wave of said network, selectively operable means at a control point remote from said central point for effecting the following operations at the central point at the will of the operator: controlling the first named selective operable relay by generating and transmitting thereto carrier control currents of said predetermined frequency during said first named alternate half cycles of the alternating current wave; and, controlling the second named selectively operable relay by generating and transmitting thereto carrier control currents of said frequency during said opposite alternate half cycles of the alternating current wave.

STUART W. SEELEY.